United States Patent
Lickfelt et al.

(10) Patent No.: US 8,249,802 B2
(45) Date of Patent: Aug. 21, 2012

(54) VEHICLE KEYLESS OPERATION SYSTEM AND METHOD

(75) Inventors: Brian K. Lickfelt, Powell, OH (US); Hideaki Arai, Powell, OH (US); Jason D. DiSalvo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 12/541,419

(22) Filed: Aug. 14, 2009

(65) Prior Publication Data

US 2011/0040424 A1  Feb. 17, 2011

(51) Int. Cl.
  *G06F 7/00* (2006.01)
(52) U.S. Cl. .............................. 701/408; 701/48; 701/36
(58) Field of Classification Search ................ 701/2, 36, 701/45, 49, 408, 409; 340/5.6, 5.61, 5.1, 340/5.64, 5.72
See application file for complete search history.

(56) References Cited

U.S. PATENT DOCUMENTS

| 5,600,323 | A  | 2/1997  | Boschini |
| 6,154,145 | A  | 11/2000 | Talbot |
| 6,271,765 | B1 | 8/2001  | King et al. |
| 6,549,117 | B1 | 4/2003  | Kato et al. |
| 6,563,430 | B1 | 5/2003  | Kemink et al. |
| 6,744,364 | B2 | 6/2004  | Wathen |
| 7,292,134 | B2 | 11/2007 | Conner et al. |
| 2005/0242970 | A1 | 11/2005 | Blaker et al. |
| 2006/0197677 | A1 | 9/2006  | Watanabe et al. |
| 2007/0085658 | A1 | 4/2007  | King et al. |
| 2007/0158125 | A1 | 7/2007  | Braeuchle et al. |
| 2007/0162191 | A1 | 7/2007  | Matsubara et al. |
| 2007/0203618 | A1 | 8/2007  | McBride et al. |
| 2007/0205863 | A1 | 9/2007  | Eberhard |
| 2008/0055116 | A1 | 3/2008  | Luo et al. |

*Primary Examiner* — Richard M. Camby
(74) *Attorney, Agent, or Firm* — Rankin, Hill & Clark LLP

(57) ABSTRACT

A keyless function system and method includes a portable device having a vehicle function actuator thereon for initiating operation of a vehicle function. The portable device transmits an actuation signal to the vehicle when the vehicle function actuator is actuated. The receiver onboard the vehicle receives the actuation signal from the portable device. A controller onboard the vehicle and operatively connected to the receiver determines at least one of: whether the vehicle is located at a predetermined location or whether the portable device is located less than a predetermined distance from the vehicle. The controller selectively commands performance of the vehicle function when the actuation signal is received by the receiver based on at least one of: whether the vehicle is at the predetermined location or the portable device is less than the predetermined distance from the vehicle.

15 Claims, 3 Drawing Sheets

VEHICLE KEYLESS OPERATION SYSTEM AND METHOD

BACKGROUND

The present disclosure relates to a vehicle keyless operation system and method, and more particularly relates to vehicle keyless operation system and method that changes how the vehicle responds to a command from a keyless remote device based on one or more factors.

Current vehicle systems often include a remote key fob capable of remotely unlocking and locking vehicle doors. Typically, the key fob (or some other keyless remote device) transmits RF signals to the vehicle. These signals are received by a receiver having an antenna and are processed by an onboard vehicle control unit. Upon receipt, the control unit can command a door locking device to an unlock position or to a lock position, as appropriate.

More recently, additional functionality is being incorporated into the remote key fob. For example, the key fob can include one or more push buttons that are depressed by an individual to open or close power windows or a sunroof, sliding doors, tailgates, etc. In addition, or in the alternative, existing buttons of the key fob (e.g., lock and unlock buttons) can be operated in a predetermined manner to effect alternate vehicle functionality remotely. In one example, an unlock button can be depressed two consecutive times and held on the second depression to effect remote opening of windows of the vehicle.

While keyless and remote devices have become ubiquitous in association with vehicles, keyless function misoperation continues to be a problem. Misoperation can occur when a person "unintentionally" operates a keyless function in a range of his or her vehicle, such that the function occurs. One example of such a misoperation could be with a vehicle equipped with a power tailgate that is parked in a garage, and a power tailgate button on a remote unit is pressed (e.g., inadvertently). The power tailgate could open into the garage door or other surrounding structure potentially causing property damage to the garage and/or the tailgate.

BRIEF DESCRIPTION

According to one aspect, a keyless function method for a vehicle includes receiving an actuation signal from a portable device for performing a vehicle function, determining a location of at least one of the vehicle or the portable device, and selectively performing the vehicle function when the actuation signal is received based on the location as determined in the preceding step.

According to another aspect, a keyless function system is provided for a vehicle. More particularly, in accordance with this aspect, the system includes a portable device having a vehicle function actuator thereon for initiating operation of a vehicle function. The portable device transmits an actuation signal when the vehicle function actuator is actuated. A receiver is onboard the vehicle for receiving the actuation signal from the portable device. A controller is also onboard the vehicle and is operatively connected to the receiver. The controller is configured to determine at least one of: whether the vehicle is located at a predetermined location or the portable device is less than a predetermined distance from the vehicle. The controller is further configured to command performance of the vehicle function when the actuation signal is received by the receiver based on at least one of: whether the vehicle is located at the predetermined location or the portable device is less than the predetermined distance from the vehicle.

According to still another aspect, a method is provided for performing a vehicle function from a remote portable device based on a vehicle and a portable device location. In the method, an actuation signal is received from a portable device for performing a vehicle function. Whether the vehicle is at a predetermined location and whether the portable device location indicates that the portable device is less than the predetermined distance from the vehicle are determined. The vehicle function is performed if one of: the vehicle location does not match the predetermined location, or both the vehicle location matches the predetermined location and the portable device location indicates that the portable device is less than the predetermined distance from the vehicle. The vehicle function is inhibited if the vehicle location matches the predetermined location and the portable device location indicates that the portable device is not less than the predetermined distance.

DETAILED DESCRIPTION

Figure 1:
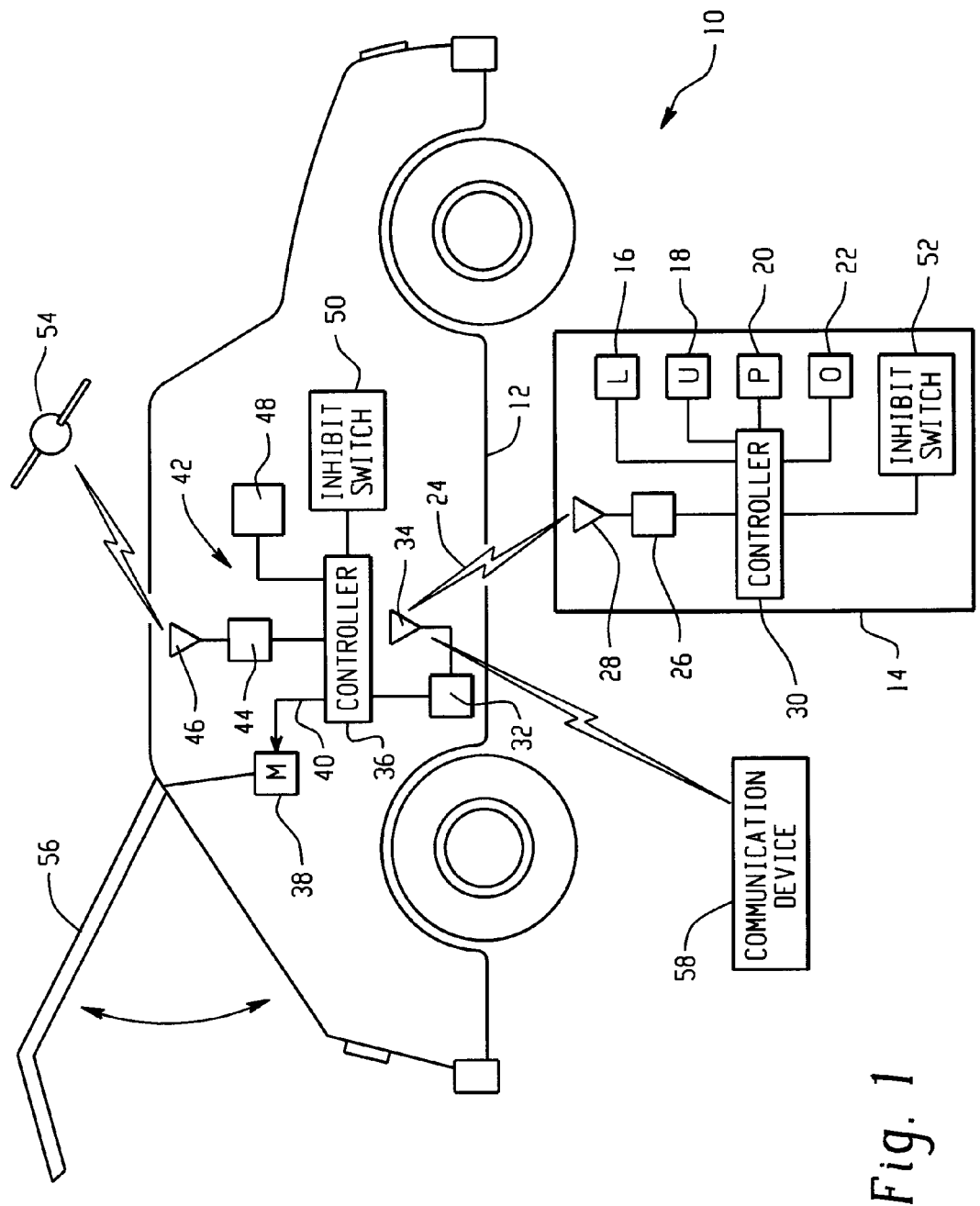
FIG. 1 is a schematic diagram showing an exemplary embodiment of a keyless function system.

Referring now to the drawings, wherein the showings are for purposes of illustrating one or more exemplary embodiments and not for purposes of limiting the same, FIG. 1 schematically illustrates a keyless function system 10 for a vehicle 12. As shown, the system 10 includes a portable device 14, such as a key fob, having at least one vehicle function actuator thereon (e.g., actuators 16, 18, 20, 22) for initiating operation of a corresponding vehicle function. In the illustrated embodiment, the portable device 14 includes a first actuation button 16, a second actuating button 18, a third actuating button 20, and a fourth actuating button 22. The portable device 14 can be a stand-alone device or can be integrated into another component, such as a vehicle key.

By way of example, the first actuating button 16 can correspond to the vehicle function of locking doors of the vehicle 12 and the second actuator button 18 can correspond to the vehicle function of unlocking doors of the vehicle 12. The third actuating button 20 can correspond to the vehicle function of initiating a panic mode for the vehicle 12 and the fourth actuating button 22 can correspond to the vehicle function of powered opening of a vehicle closure, such as vehicle tailgate 56. In one exemplary embodiment, the actuators 16-22 are buttons disposed on a housing, the buttons being actuated by depression thereof.

Of course, it is to be appreciated and understood by those skilled in the art that the actuators 16-22 can take other configurations and be actuated in other known manners. Additionally, it is to be appreciated and understood that the actuators 16-22 can individually correspond to more than a single vehicle function (e.g., depression of the actuator 16 a single time could correspond to powered locking of the doors of the vehicle 12 and actuation of the actuator 16 two times with a hold-down on the second depression could correspond to a closing windows function on the vehicle). It is also to be understood and appreciated that fewer or more actuators than those shown in the illustrated embodiment could be employed on the portable device 14.

In any case, the portable device 14 can transmit an actuation signal 24 to the vehicle 12 when one of the vehicle function actuators 16-22 is actuated. For example, when the actuator 22 is actuated, actuation signal 24 can be transmitted from the portable device 14 to the vehicle 12 which corresponds to the vehicle function associated with the actuator 22 (e.g., powered opening of the tailgate 56). The portable device 14 can include a transmitter 26 having an antenna 28 for sending the actuation signal 24 to the vehicle 12. The portable device 14 can further include a controller or control unit 30 for coordinating communication and operations between the actuators 16-22 and the transmitter 26. For example, the control unit 30 can command the portable transmitter 26 to send corresponding actuation signal 24 when one of the actuators 16-22 is actuated.

The system 10 also includes a receiver 32 having an antenna 34 onboard the vehicle 12 for receiving the actuation signal 24 from the portable device 14. As is known and understood by those skilled in the art, the transmitter 26 of the portable device 14 and/or the receiver 32 of the vehicle 12 can be transceivers for both transmitting signals and receiving signals back and forth. In such a configuration, the portable device 14 can employ smart entry functionality wherein certain vehicle functions, such as unlocking of the vehicle doors, can occur without actuation of the unlock actuator 18; instead, bringing the portable device 14 within a search field transmitted by the vehicle 12, such as transmitted by the antenna 34, could cause the portable device 14 and the vehicle 12 to communicate with one another, which can ultimately result in unlocking of the vehicle doors of the vehicle 12 without depression of an actuator (e.g., button 18) on the portable device 14.

The illustrated system 10 further includes a controller 36 onboard the vehicle 12 and operatively connected to the receiver 32. The controller 36 can be the vehicle's main electronic control unit (ECU), can be integrated into a subsystem controller of the vehicle 12 (e.g., the vehicle's navigational system controller), or could be a stand-alone controller. As will be described in more detail below, the controller 36 can be configured to determine at least one of: whether the vehicle 12 is located at a predetermined location and/or the portable device is less than a predetermined distance (e.g., five meters) from the vehicle. The controller can be further configured to selectively command performance of a vehicle function (e.g., powered opening of the tailgate 56) when the actuation signal 24 is received by the receiver 32 based on at least one of: whether the vehicle 12 is located at the predetermined location and/or the portable device is less than the predetermined distance from the vehicle. In an exemplary embodiment, the controller 36 can command performance of a vehicle function (e.g., powered opening of the tailgate 56) when determined that both the portable device is less than the predetermined distance from the vehicle and the vehicle is located at the predetermined location.

In one embodiment, the controller 36 calculates the distance between the portable device 14 and the vehicle 12 based on a received signal strength indication (RSSI) of the actuation signal 24. In particular, the receiver 32 can receive the actuation signal 24 through its antenna 34. From the signal 24, the receiver 32 can generate a RSSI signal and communicate this signal to the controller 36 for processing thereof. For example, the controller 36 can compare the RSSI signal to those provided in a look-up table stored in a memory of the controller 36 for correlating the RSSI signal to a particular distance between the vehicle 12 and the portable device 12.

The vehicle 12 can include a plurality of vehicle closures mounted thereon (e.g., passenger doors, a sunroof, a tailgate, etc.). For example, in the illustrated embodiment the tailgate 56 is a vehicle closure mounted on the vehicle 12. In addition, a closure motor 38 can be mounted on a vehicle 12 for powered opening of one of the vehicle closures. As shown in the illustrated embodiment, closure motor 38 is provided and operatively connected to the tailgate 56 for powered opening and/or closing of the tailgate 56. To effect powered opening of the tailgate 56 by the motor 38, the controller 36 can selectively send a command signal 40 to the motor 38 to open the vehicle closure 56. In the system 10 of the illustrated embodiment, and as will be described in more detail below, the controller 36 can send command signal 40 to the motor 38 to open the tailgate 56 when the actuation signal 24, which can correspond to the vehicle function of powered opening of the tailgate 56, is received by the receiver 32, but only if the vehicle 12 is not determined to be in the predetermined location, or if the vehicle is determined to be in the predetermined position but the distance between the vehicle 12 and the portable device 14 is determined to be less than the predetermined distance (e.g., 5 m) by the controller 36. Alternatively, the controller 36 can send the command signal 40 based only on the distance between the vehicle 12 and the portable device 14. For example, if the portable device 14 is less than the predetermined distance from the vehicle 12, the command signal 40 is sent; otherwise, it is not sent (regardless of the vehicle location).

The controller 36 can include or be operatively connected to a vehicle communication system 42 that determines and communicates the location of the vehicle 12 to the controller 36 so the controller is able to determine whether the vehicle 12 is located at the predetermined location, a location that can be stored in a memory of the controller 36. In one embodiment, the vehicle communication system 42 is a GPS navigational system including a GPS receiver 44 having an antenna 46 and a touch screen interface 48. As is conventional, the receiver 44 though the antenna 46 can receive global positioning information from an associated GPS satellite 54. This information can be used by the controller 36 to determine a present location of the vehicle. While not illustrated, it is to be appreciated that the vehicle communication system 42 can have its own controller separate from the controller 36 or such functionality of the vehicle communication system 42 can be integrated into the controller 36.

When the vehicle communication system 42 is a GPS navigational system, such as shown in the illustrated embodiment, the predetermined location stored in the memory of the controller 36 can be set or adjusted through the touch screen interface 48. Alternatively, or in addition, the GPS navigational system could include other means for inputting the predetermined location into the memory of the controller 36 (e.g., keyboard, multi-position command switch, etc.). In other embodiments, the vehicle communication system 42 could be some other communication system that determines the present location of the vehicle and/or assists the controller 36 in determining whether the vehicle 12 is at the predetermined location. For example, the vehicle communication system 42 could be a HomeLink® system available from Johnson Controls Technology Company, whereby the HomeLink® system communicates with some other component not mounted onboard the vehicle 12 to determine the present location of the vehicle and/or determine whether the vehicle is located at the predetermined location (e.g., a HomeLink® transceiver or other communication device 58 positioned at a vehicle owner's home).

The system 10 can further include an inhibit switch 50 mounted onboard the vehicle 12. In one embodiment, the inhibit switch 50 is provided for inhibiting use of the determination as to whether the vehicle 12 is located at the predetermined location when the switch 50 is in an ON position. The controller 36 can be operatively connected to the inhibit switch 50 and configured to always command performance of the vehicle function corresponding to the actuation signal 24 when the inhibit switch 50 is in its ON position regardless of whether the vehicle 12 is located at the predetermined location. In addition, or in the alternative, an inhibit switch 52 can be provided on the portable device 14 and function in the same manner as the inhibit switch 50 on the vehicle 12. In another embodiment, the inhibit switch 50 can inhibit the determination as to whether the portable device 14 is more than the predetermined distance from the vehicle 12 when in the ON position.

Figure 2:
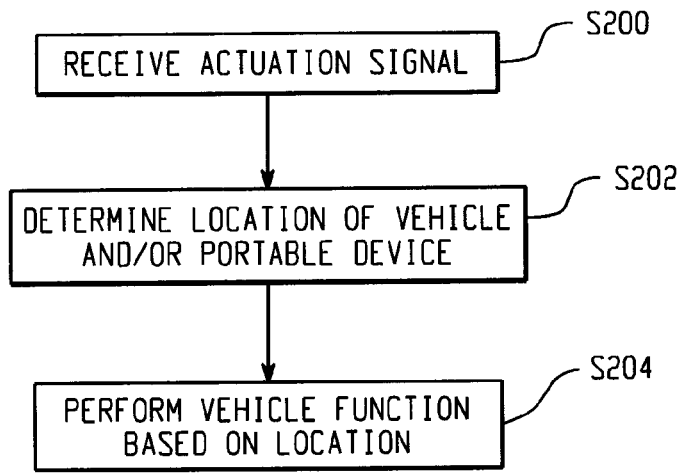
FIG. 2 is a process diagram illustrating an exemplary embodiment of a keyless function method for a vehicle.

With reference to FIG. 2, an exemplary keyless function method for a vehicle will now be described. In particular, the keyless function method of FIG. 2 will be described with reference to the system 10 of FIG. 1 though it need not be limited to the illustrated system of FIG. 1. In S200, actuation signal 24 is received from portable device 14 for performing a vehicle function. As already discussed, the portable device 14 includes actuators 16-22. Actuation of one of the actuators 16-22 results in portable device controller 30 commanding transmitter 26 via antenna 28 to transmit actuation signal 24 where the actuation signal 24 corresponds to the actuator 16-22 actuated. For example, actuator 22 can be a button corresponding to the vehicle function of powered opening of a closure on the vehicle 12, such as powered opening of the tailgate 56 on the vehicle 12. Depression of button actuator 22 results in the controller 30 commanding the transmitter 26 via the antenna 28 to communicate an actuation signal 24 indicating that the tailgate 56 is to be opened. Other vehicle functions can include powered opening of a power sliding door, powered opening of a trunk, etc.

In S202, the present location of at least one of the vehicle 12 or the portable device 14 can be determined. The present location of the vehicle 12 can be determined by the vehicle communication system 42, which can be a GPS navigational system as described above or another system capable of determining the present location of the vehicle 12. The present location of the portable device 14, particularly relative to the vehicle 12, can be determined from a received signal strength indication (RSSI) corresponding to the actuation signal 24. In S204, the vehicle function corresponding to the actuation signal 24 (e.g., powered opening of the tailgate 56) is selectively performed when the actuation signal 24 is received based on the location of the vehicle 12 and/or the portable device 14 as determined in S202.

Figure 3:
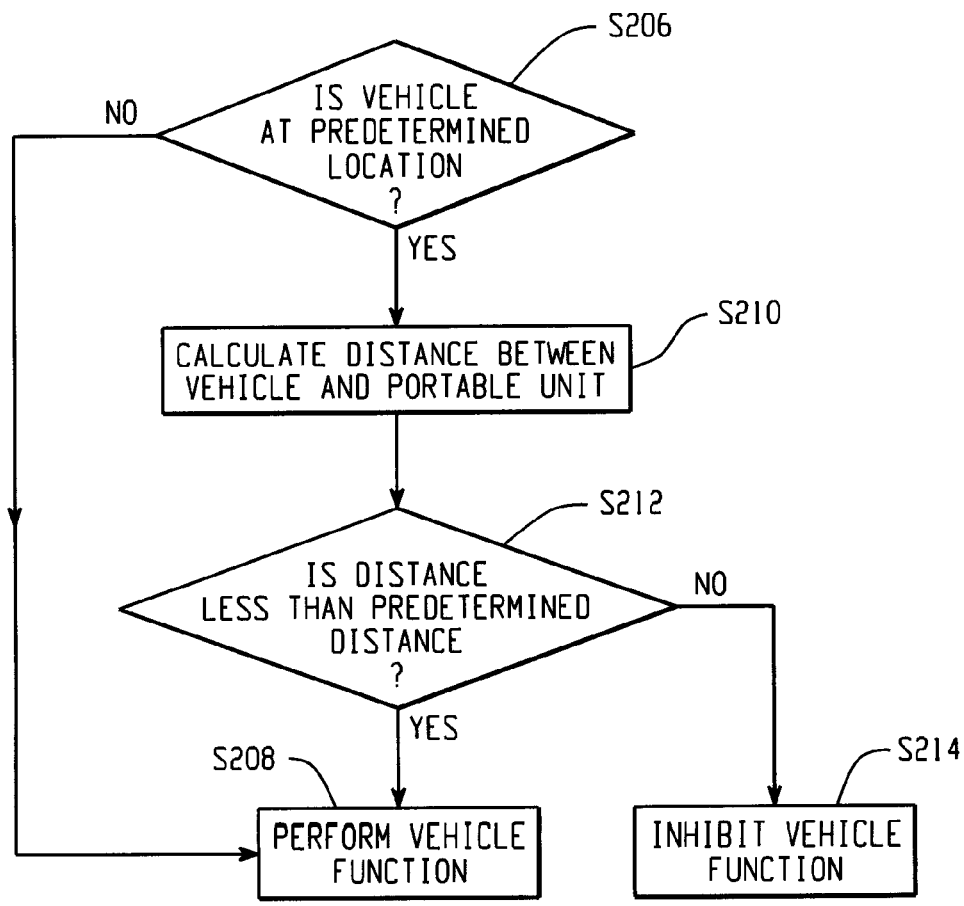
FIG. 3 is a process diagram illustrating an exemplary embodiment of a method of performing a vehicle function based on vehicle location.

With additional reference to FIG. 3, one method for performing the vehicle function when the actuation signal 24 is received is shown. In this embodiment, determining the location in S202 (FIG. 2) includes determining the location of the vehicle 12 and selective performance of the vehicle function when the actuation signal is received in S204 (FIG. 2) is based on the location of the vehicle 12. Specifically, as shown in FIG. 3, selectively performing the vehicle function based on the vehicle location in S204 can include: determining whether the present location of vehicle 12 matches a predetermined location (S206), and performance of the vehicle function can be based on the determination of whether the location of the vehicle 12 matches the predetermined location (S208). In particular, when the vehicle 12 is not at the predetermined location as determined in S206, performing the vehicle function based on the determination of whether the location of the vehicle matches the predetermined location in S204 includes always performing the vehicle function in S208. If, however, the vehicle 12 is determined to be at the predetermined location in S206, the method continues to S210.

In S210, a distance between the portable device 14 and the vehicle 12 is calculated. Calculating the distance between the portable device 14 and the vehicle 12 in S210 can include receiving a received signal strength indication (RSSI) of signal 24 from the portable device 14 to indicate the distance between the portable device 14 and the vehicle 12. Next, in S212, whether the distance calculated in S210 is less than the predetermined amount or distance is determined. The predetermined distance can be 5 meters, for example, though of course, some other distance can be used. The selection of the predetermined distance can correspond to a distance mandated by regulation and/or a distance sufficiently limited such that a user operating the portable device 14 within the predetermined distance can be predicted to be close enough to be aware of the surrounding conditions relative to the vehicle 12 (e.g., aware of whether the tailgate 56 is likely to impact any surrounding object relative to the vehicle 12, such as a garage door or structure). When the vehicle 12 is determined to be at the predetermined location in S206, performance of the vehicle function in S208 occurs only when determined that the distance between the portable device 14 and the vehicle 12 (calculated in S210) is less than the predetermined distance (as determined in S212). If the distance between the portable device 14 and the vehicle 12 is not less than the predetermined distance, the vehicle function is inhibited at S214 (i.e., the vehicle function does not occur).

While the method of FIGS. 2 and 3 has been described in reference to actuation of a single actuator and a single vehicle function (e.g., actuator 22 for powered opening of tailgate 56), it is to be understood and appreciated that the system 10 and methods described herein could be used in association with multiple actuators (e.g., all actuators 16-22) and/or actuating means (e.g., a single actuator button operated in different manners corresponding to different vehicle functions), as well as multiple vehicle functions. In addition, where multiple vehicle functions are used, the system 10 and methods described herein can be expanded to use the same or varying predetermined locations for each of the various vehicle functions and/or the same or varying predetermined distances for each of the various vehicle functions. For example, a first vehicle function could correspond to actuator 16 that has its own predetermined location and its own predetermined amount or distance for allowing/inhibiting the first vehicle function to occur when the vehicle 12 is at the first vehicle function's predetermined location. A second vehicle function could correspond to the actuator 18 that has likewise has its own predetermined location and its own predetermined amount or distance for allowing/inhibiting the second vehicle function to occur when the vehicle is at the second vehicle function's predetermined location. Still further, one or more vehicle functions could have their performance commanded based on the vehicle location alone, one or more vehicle functions could have their performance commanded based on distance between the portable device and the vehicle, and/or one or more vehicle functions could have their performance commanded based on both the vehicle location and the distance between the portable device and the vehicle.

The methods illustrated in FIGS. 2 and 3 can additionally include a step of selecting a predetermined location (when used) through an interface, such as touch screen interface 48 of the vehicle navigational system 42. In one embodiment, determining the location of the vehicle in S206 (or whether the vehicle location matches the predetermined location in S026) employs an onboard vehicle communication system, other than the illustrated navigational system 42, that communicates with a communication device 58 located at or adjacent the predetermined location. For example, the communication system 42 could be a HomeLink® system that communicates with a receiver at the vehicle owner's home. Alternatively, the vehicle communication system could communicate with other remotely positioned stations (e.g., central processing center, cellular towers, etc.) to determine the present location of the vehicle 12.

Optionally, performing the vehicle function based on the vehicle location in S204 can correspond to the position of an inhibit switch such as inhibit switch 50 and/or inhibit switch 54. For example, performing the vehicle function based on the vehicle location in S204 can occur only when the inhibit switch is in an ON position (i.e., only when an inhibit mode is on); otherwise, the vehicle function is performed regardless of whether the vehicle 12 is located at the predetermined location.

Figure 4:
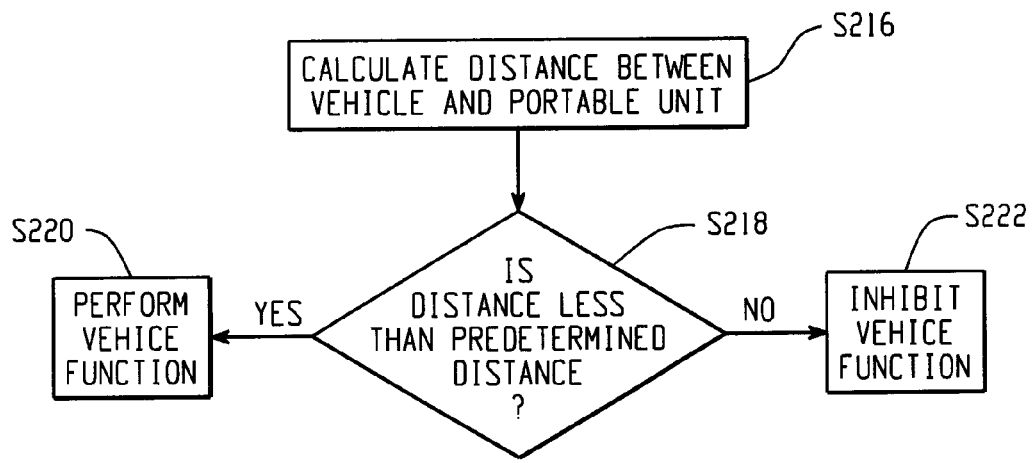
FIG. 4 is a process diagram illustrating an exemplary embodiment of a method of performing a vehicle function based on portable device location.

With reference to FIG. 4, another method for performing the vehicle function when the actuation signal 24 is received is shown. In this embodiment, determining the location in S202 (FIG. 2) includes determining the location of the portable device 14 relative to the vehicle 12 and selective performance of the vehicle function when the actuation signal 24 is received in S204 (FIG. 2) is based on the location of the portable device 14 relative to the vehicle 12. Specifically, as shown in FIG. 4, selectively performing the vehicle function based on the portable device location in S204 can include calculating the distance between the vehicle 12 and the portable device 14 in S216 and determining whether the distance calculated in S216 is less than a predetermined distance (e.g., five meters) in S118. As already described, calculating the distance between the portable device 14 and the vehicle 12 in S216 can include receiving a received signal strength indication (RSSI) from the portable device 14 to indicate the distance between the portable device 14 and the vehicle 12. When the calculated distance is less than the predetermined distance, the vehicle function is performed in S220. When the calculated distance is not less than the predetermined distance, the vehicle function is inhibited in S222.

Figure 5:
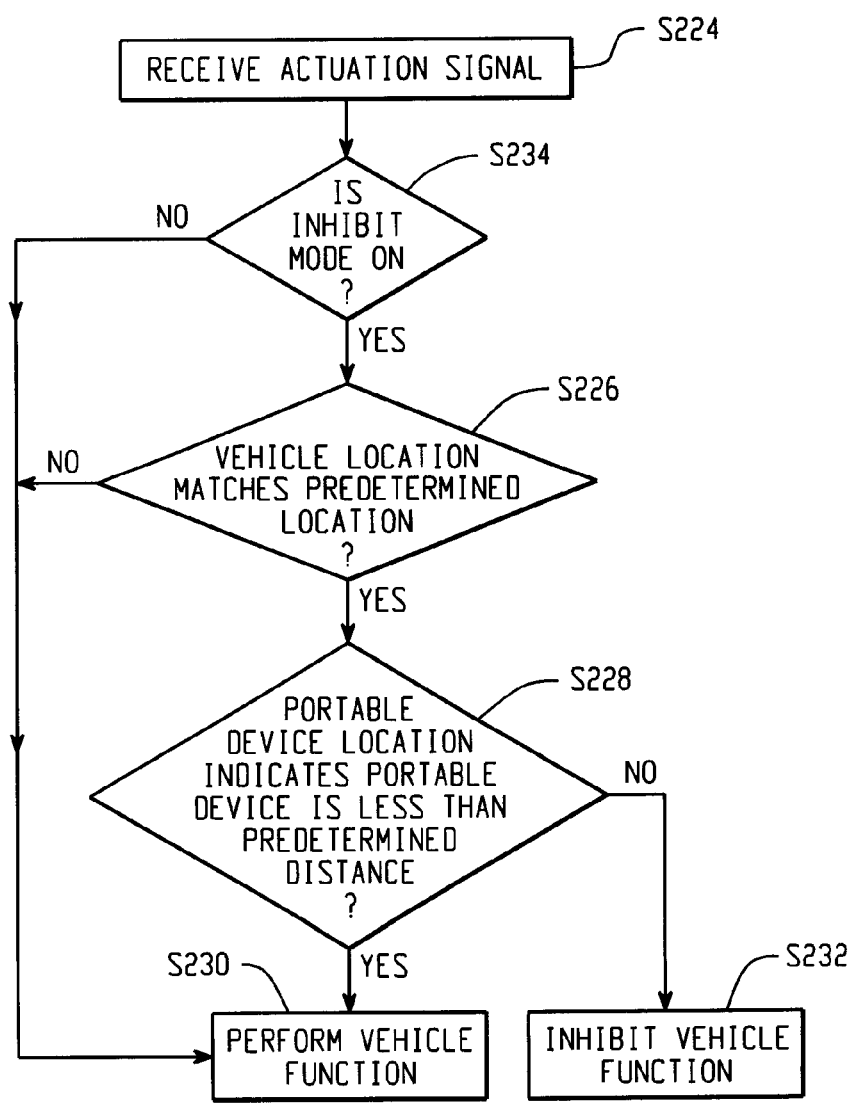
FIG. 5 is a process diagram illustrating another exemplary embodiment of a keyless function method having an inhibit mode determination step.

With reference to FIG. 5, another process diagram is shown to illustrate a method for performing a vehicle function from a remote portable device, such as device 14, based on a vehicle location and a portable device location. In S224, an actuation signal 24 is received from the portable device 14 for performing a vehicle function. As described above, the vehicle function can be powered opening of a powered tailgate, powered opening of a power sliding door, powered opening of a trunk, or some other vehicle function. Moreover, the vehicle function can correspond to an actuator on the portable device 12, such as actuators 16-22, which can be button actuators, though this is not required. Specifically, the receiver 32 through the antenna 34 onboard the vehicle 12 can receive actuation signal 24 from the portable device 14. The actuation signal 24 can be generated by the transmitter 26 through the antenna 28 and commanded by the controller 30, which can correspond to one of the actuators 16-22 being actuated.

In S226, a determination is made as to whether the vehicle location matches a predetermined location and, in S228, a determination is made as to whether the portable device location indicates that the portable device is less than a predetermined distance from the vehicle. As already described, the predetermined location can be stored in a memory of the controller 36 and such predetermined location can be entered or modified as desired by the user. For example, the owner of the vehicle 12 could input the predetermined location through the touch screen interface 48 of the vehicle's navigational system 42 and/or could modify the predetermined location through the touch screen interface 48. In an exemplary embodiment, the predetermined location could be the home or residence of the owner of the vehicle 12.

In S230, the vehicle function corresponding to the actuation signal received in S224 is performed if one of: the vehicle 12 is not determined to be at the predetermined location in S226 or both the vehicle is determined to be at the predetermined location in S226 and the portable device location indicates that the portable device 14 is less than the predetermined distance from the vehicle 12 in S228. Otherwise, in S232, the vehicle function corresponding the actuation signal received in S224 is inhibited (i.e., if the vehicle is determined to be at the predetermined location in S226 and the distance is not determined to be less than the predetermined amount in S228).

Optionally, the inhibit switch 50 can be provided on the vehicle 12 and/or the inhibit switch 54 can be provided on the portable unit 14. When included, a determination is made in S234 as to whether the inhibit mode switch 50 (or switch 52) is in an ON position. If the inhibit mode switch 50 (or switch 52) is not in the ON position, the vehicle function is performed in S230 regardless of whether the vehicle 12 is at the predetermined location and regardless of whether any distance calculated between the vehicle 12 and the portable device 14 is less than a predetermined distance. When the vehicle is at the predetermined location as determined in S226 and, when included, the inhibit mode switch 50 or switch 52 is in an ON position to turn on an inhibit mode as determined in S234, the method advances to S228.

When the inhibit mode switch 50 (or switch 52) is included, inhibiting the vehicle function in S232 can only occur when the inhibit mode switch 50 (or switch 52) is in an ON position; otherwise performing the vehicle function S230 occurs regardless of whether the vehicle is at the predetermined location as determined in S226 and regardless of whether the distance between the vehicle 12 and the portable device 14 is less than the predetermined amount as determined in S228.

It is to be appreciated that in connection with the particular exemplary embodiments presented herein, certain structural and/or functional features are described as being incorporated in defined elements and/or components. However, it is calculated that these features, to the same or similar benefit, also likewise be incorporated in common elements and/or components or separated, where appropriate. For example, the controller 36 could be distributed throughout the system 10. It is also to be appreciated that different aspects of the exemplary embodiments may be selectively employed as appropriate to achieve other alternative embodiments suited for desired applications, the other alternate embodiments thereby realizing the respective advantages of the aspects incorporated herein. It is also to be appreciated that particular elements or components described herein may have their functionality suitably implemented via hardware, software, firmware, or in combination.

Additionally, it is to be appreciated that certain elements described herein as incorporated together may under suitable circumstances be stand-alone elements or otherwise divided. For example, the controller 36 for the system 10 could be separated from a controller for the vehicle communication system, such as a navigational control unit. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

The exemplary embodiment(s) have been described above. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A keyless function method for a vehicle, comprising:
receiving an actuation signal from a portable device for performing a vehicle function;
determining a location of the vehicle; and
selectively performing the vehicle function when the actuation signal is received based on the location as determined in the preceding step, wherein selectively performing the vehicle function based on the location includes:
 determining whether the location of the vehicle matches a predetermined location; and
 calculating a distance between the portable device and the vehicle when determined that the location of the vehicle matches the predetermined location;
 determining whether the distance calculated is less than a predetermined distance, and
 performing the vehicle function when the location of the vehicle matches the predetermined location only when determined that the distance is less than the predetermined amount.

2. The method of claim 1 wherein calculating the distance between the portable device and the vehicle includes receiving a received signal strength indication (RSSI) from the portable device to indicate the distance between the portable device and the vehicle.

3. A keyless function method for a vehicle, comprising:
receiving an actuation signal from a portable device for performing a vehicle function;
determining a location of the vehicle; and
selectively performing the vehicle function when the actuation signal is received based on the determined location, wherein selectively performing the vehicle function based on the location includes:
 determining whether the location of the vehicle matches a predetermined location, and
 performing the vehicle function is based on the determination of whether the location of the vehicle matches the predetermined location, and
wherein performing the vehicle function based on the determination of whether the location of the vehicle matches the predetermined location includes always performing the vehicle function when determined that the vehicle is not at the predetermined location.

4. A keyless function method for a vehicle, comprising:
receiving an actuation signal from a portable device for performing a vehicle function;
determining a location of the vehicle; and
selectively performing the vehicle function when the actuation signal is received based on the determined location, wherein selectively performing the vehicle function based on the location includes:
 determining whether the location of the vehicle matches a predetermined location, and
 performing the vehicle function is based on the determination of whether the location of the vehicle matches the predetermined location, and
wherein performing the vehicle function based on the determination of whether the location of the vehicle matches the predetermined location occurs only when an inhibit mode is on; otherwise, the vehicle function is performed regardless of whether the location of the vehicle matches the predetermined location.

5. The method of claim 1 further including:
selecting the predetermined location through an interface of a vehicle navigational system.

6. The method of claim 1 wherein determining whether the location of the vehicle matches the predetermined location includes an onboard vehicle communication system communicating with a communication device located at or adjacent the predetermined location.

7. The method of claim 1 wherein the vehicle function is at least one of powered opening of a powered tailgate, powered opening of a powered sliding door or powered opening of a trunk.

8. The method of claim 7 wherein the vehicle function is powered opening of a powered tailgate.

9. The method of claim 1 further including determining the location of the portable device relative to the vehicle.

10. The method of claim 9 wherein selectively performing the vehicle function includes determining whether the location of the portable device is more than a predetermined distance relative to the vehicle.

11. The method of claim 9 further including:
calculating a distance between the location of the portable device and the vehicle; and
determining whether the distance calculated in the preceding step is less than a predetermined distance.

12. The method of claim 11 wherein calculating the distance between the portable device and the vehicle includes receiving a received signal strength indication (RSSI) from the portable device to indicate the distance between the portable device and the vehicle.

13. A method for performing a vehicle function from a remote portable device based a vehicle location and a portable device location, comprising:
receiving an actuation signal from a portable device for performing a vehicle function;
determining whether the vehicle location matches a predetermined location;
determining whether the portable device location indicates that the portable device is less than a predetermined distance from the vehicle;
performing the vehicle function if one of: the vehicle location does not match the predetermined location, or both the vehicle location matches the predetermined location and the portable device location indicates that the portable device is less than the predetermined distance from the vehicle; and
inhibiting the vehicle function if the vehicle location matches the predetermined location and the portable device location indicates that the portable device is not less than the predetermined distance.

14. A method for performing a vehicle function from a remote portable device based a vehicle location and a portable device location, comprising:

receiving an actuation signal from a portable device for performing a vehicle function;

determining whether the vehicle location matches a predetermined location;

determining whether the portable device location indicates that the portable device is less than a predetermined distance from the vehicle;

performing the vehicle function if one of: the vehicle location does not match the predetermined location, or both the vehicle location matches the predetermined location and the portable device location indicates that the portable device is less than the predetermined distance from the vehicle;

inhibiting the vehicle function if the vehicle location matches the predetermined location and the portable device location indicates that the portable device is not less than the predetermined distance; and providing an inhibit mode switch on the vehicle, wherein inhibiting the vehicle function occurs only when the inhibit mode switch is in an ON position, otherwise performing the vehicle function occurs regardless of whether the vehicle is at the predetermined location and regardless of whether the portable device location indicates that the portable device is less than the predetermined distance from the vehicle.

15. The method of claim 13 wherein the vehicle function is powered opening of a closure of the vehicle.

* * * * *